Patented Feb. 22, 1927.

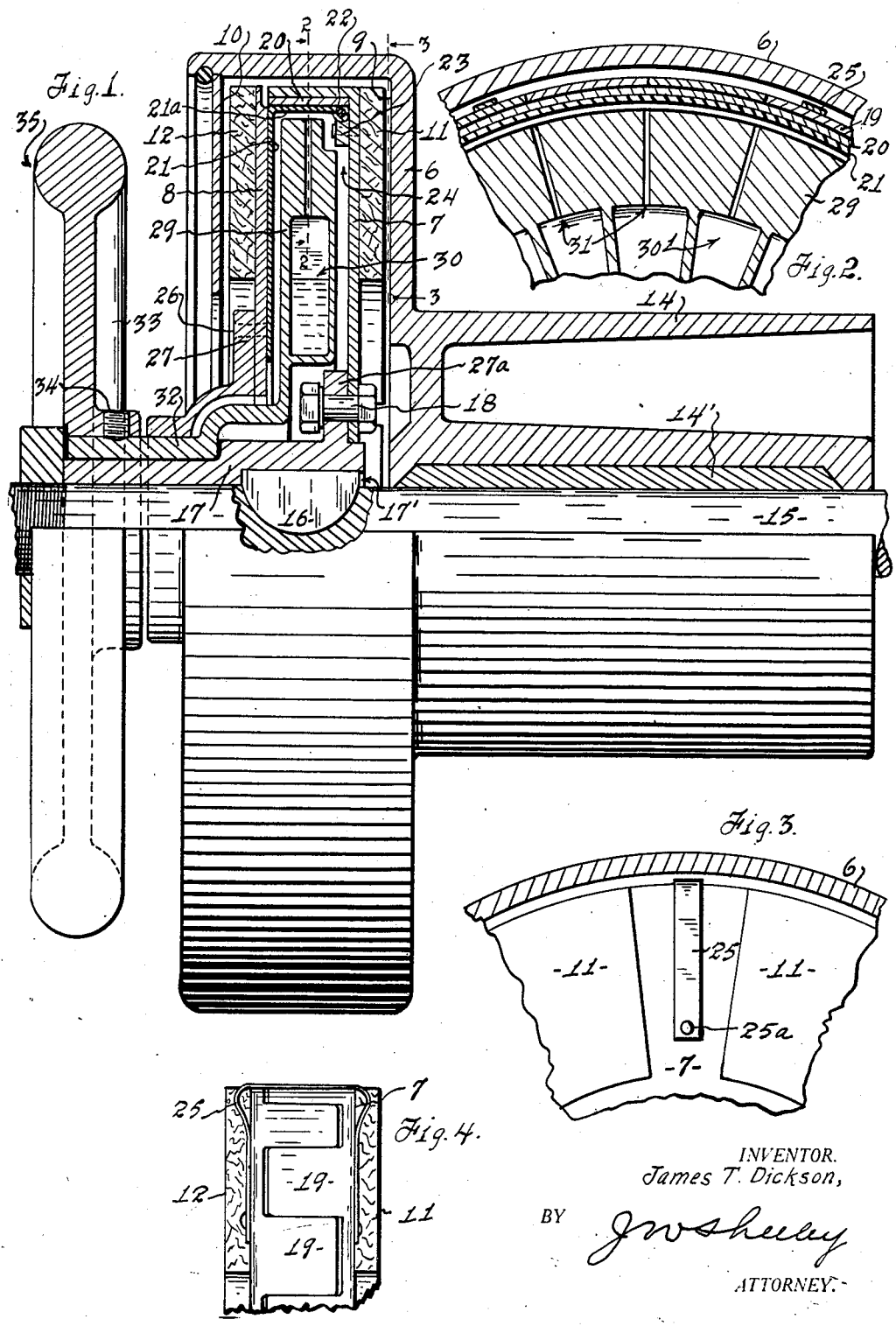

1,618,643

UNITED STATES PATENT OFFICE.

JAMES T. DICKSON, OF LOS ANGELES, CALIFORNIA.

CENTRIFUGAL CLUTCH.

Application filed February 2, 1926. Serial No. 85,426.

The present invention relates to centrifugal clutches and actuating devices for same, and has for its principal object the provision of a simple and efficient centrifugal clutch suitable for quick starting prime movers of low starting torque, such as electric motors, for instance.

Another object of the invention is to provide a clutch which will throw in automatically without sudden strain on inert parts.

Another object of the invention is to provide for using the displacing force, or head, of a rapidly revolving body of fluid, such as water or oil, to throw the clutch.

Another object of the invention is to provide a centrifugal clutch between a driving and a driven member, which will throw in automatically after the driving shaft has attained a predetermined speed. Certain prime movers attain full speed very quickly, and at such speed they have a high reserve of power, so that if the driving member is connected with the driven member too suddenly, the driven member will be subject to excessive strain. It is therefore another object of the invention to provide an automatic clutch which will not only delay action until the driving member has attained full speed, but which will act to slowly pick up the load of the driven member, so that the driven member may be gradually but steadily accelerated to full speed.

Another object of the invention is to provide a clutch of the above described type, which may be thrown out readily while the prime mover is running at full speed.

Another object of the invention is to provide for throwing out the clutch without the usual levers, toggles, cams and other intricate arrangements of parts common to mechanisms of this class.

Still another object is to provide a clutch, which may be so controlled that the driving parts may rotate freely, without effect on the driven parts, at any speed, and for any length of time until the operator desires to have the load of the driven member picked up.

Still other objects and advantages will appear hereinafter.

I have illustrated my invention by the accompanying drawings, in which;

Figure 1 is a view partially in section and partially in elevation of a preferred embodiment of my invention.

Figure 2 is a view in section on a line 2—2 of Fig. 1.

Figure 3 is a view in section on a line 3—3 of Fig. 1.

Figure 4 is a view in elevation of an upper portion of the assembly hereinafter known as the disks.

More specifically, in carrying out my invention in the present embodiment, I employ a clutch drum 6 and a pair of spaced movable discs 7 and 8, respectively. The drum is provided with spaced friction surfaces 9 and 10, respectively, while the discs carry friction plates 11 and 12, respectively, adapted to frictionally engage said friction surfaces 9 and 10.

The drum, in this instance, is integral with a pulley 14. The drum and its pulley are mounted revolubly on a shaft 15, while the discs are fixed to revolve with the shaft while being movable apart from each other and relative to the drum's friction surfaces. The shaft is provided with a key 16, and a sleeve 17 is fitted slidably on the shaft. The sleeve is provided with a slot 17′, into which the key extends. Thus the sleeve is caused to positively revolve with the shaft while being capable of being moved longitudinally thereof. The disc 7 is fixed to the sleeve by means of bolts 18. When the shaft revolves, the drum and pulley are free to idle, but the disc 7 is rotated positively with the shaft. The discs are provided with laterally projecting interlocking fingers 19 whereby disc 7 is caused to drive disc 8. A ring 20 is provided concentrically within the annular arrangement of the spaced fingers.

In conformance with a salient feature of the invention, I provide an inflator 21, between the discs. Said inflator is closed or sealed peripherally, as at 21ª. The inflator is provided with a bead 22, which is held to the disc 7 by a ring 23. The portion 21ª of the inflator is contiguous to and coextensive with the ring 20. The major portion of the inflator 21 is disposed contiguous to the disc 8. Said inflator is preferably made of rubber or rubberized fabric, and thereby provides a peripherally sealed fluid space 24 between the discs. It will be apparent now that when the discs are revolving rapidly, fluid contained in space 24 will be thrown by centrifugal force toward ring 20. The pressure of the fluid will force the discs apart and bring the friction plates into frictional contact with the corresponding friction surfaces of the drum. The force which acts to spread the plates apart is partially resisted by spring clips 25 which embrace both plates and are attached thereto as at 25ª and tend to force them together. The tension of these spring clips, and the amount of fluid contained in the space, predetermines the speed necessary to cause the plates to engage with the drum to carry a predetermined load.

Disc 8 is secured, as at 26, to a flange 27, which is movable independently of the shaft, and which is likewise movable axially of the shaft.

It is not intended that the centrifugal action of the fluid act on the plates immediately the plates attain full speed, and therefore I provide for keeping fluid away from space 24 until a short interval has elapsed. For this purpose I provide a hollow fluid-containing member 29, revoluble independently of the shaft and discs. Said member is in the form of a hollow disc having a plurality of interior spaces or pockets 30 entirely enclosed, except for peripheral openings 31. Said pockets and openings are preferably limited to an arcuate portion of the hollow disk. Said member is provided with an integral sleeve 32, fitting loosely on the sleeve 17. Externally of the drum, I provide a hand wheel 33, which is keyed to the sleeve 32, as at 34. The member 29 is filled with a suitable fluid, such as oil, water, mercury or the like, and openings 31 are disposed uppermost, when the member 29 is at rest, so that the fluid cannot drain out. A notch 35 is provided on the hand wheel so that it may indicate the position of the openings 31.

The operation of the device is as follows:—Assuming that the shaft is that of an electric motor having a low starting torque and capable of attaining maximum speed almost immediately. When the shaft starts to rotate, the discs will rotate with it, but the fluid filled member will lag. Even after the shaft attains full speed, the fluid member will be revolving more slowly but will be gradually attaining the speed of the shaft. As the speed of the fluid filled member increases, the fluid therein will begin to escape rapidly, due to centrifugal force, through the peripheral openings. When a sufficient amount of fluid has escaped, the inflator will be expanded and the friction discs will be moved over into frictional contact with the drum. Thus the load of the drum is taken up slowly, and only after a lapse of time after the shaft has attained full speed. The lapse of time may be increased by placing a hand on the hand wheel and retarding its acceleration. As long as it is desired to have the pulley driven by the shaft, the hand wheel is untouched, and the centrifugal force of the fluid in the inflator will hold the clutch in.

Whenever it is desired to disengage the discs from the drum, or in other words, when the clutch is thrown out, the hand wheel is retarded and finally brought to rest in such position that the peripheral openings in the member 29 are uppermost. Now it will be apparent that with the hollow member motionless and the fluid in the inflator being at high head or pressure, due to its centrifugal force, said fluid will flow into the interior of the hollow member through the peripheral openings, until practically all fluid has left the inflator. When the supply of fluid in the inflator is depleted, the spring clips will be capable of moving the plates toward each other so that the frictional contact with the drum is broken. To hold the clutch out, the hand wheel is kept motionless with the peripheral openings uppermost.

I claim:—

1. In a centrifugal clutch, a drive shaft, and a centrifugally operable clutch operating means loosely fitted on said shaft to be independently revoluble; said means presenting an external friction surface engageable to retard said means.

2. In a clutch, a pair of spaced discs having a common axis and movable apart along their common axis, and a peripherally sealed hollow expansible member between said discs and rotatable therewith; said member containing a fluid element in liquid state, and a second fluid containing member within said hollow expansible member; said second member rotatable with or independently of said first named member.

3. In a clutch, a pair of spaced discs having a common axis and relatively movable along the common axis, and a flexible member joining the discs to provide a peripherally sealed chamber therebetween; said chamber containing a fluid in liquid state, and a fluid containing member between said discs; said fluid containing member rotatable independently of said discs.

4. In a clutch, a pair of spaced discs having a common axis and movable apart along their common axis, and a peripherally sealed hollow expansible member between said discs and rotatable therewith; said member containing a fluid element in liquid state, and a second fluid containing member within said hollow expansible member; said second member rotatable with or independently of said first named member, and means whereby the first and second named members are frictionally connected whereby the first named member, upon rotating, will more slowly accelerate the second named member.

5. In a clutch, a pair of spaced discs having a common axis and relatively movable along the common axis, and a flexible member joining the discs to provide a peripherally sealed chamber therebetween; said chamber containing a fluid in liquid state, and a fluid containing member between said discs; said fluid containing member rotatable independently of said discs, and means frictionally connecting said discs and said fluid containing member whereby the discs upon rotating will more slowly accelerate the fluid containing member.

6. A clutch as in claim 4, and further including; means engageable externally of the clutch for retarding the last named member without retardation of the discs.

7. A clutch as in claim 5, and further including; means engageable externally of the clutch for retarding the last named member without retardation of the discs.

8. In a clutch actuating device, a revoluble inflator having a peripherally sealed fluid actuating space, and an independently revoluble hollow member provided with peripheral openings leading into said space.

9. In a clutch actuating device, a fluid-containing revoluble inflator, and a centrifugally operable revoluble hollow member having openings leading to the interior of said inflator; said inflator and member being independently revoluble.

10. In a clutch actuating device, a fluid-containing revoluble inflator, and a centrifugally operable revoluble hollow member having openings leading to the interior of said inflator; said inflator and member being independently revoluble and frictionally connected.

11. A clutch actuating device, as in claim 10, and further including; means for retarding one with regard to the other.

12. In a clutch actuating device, a fluid-containing revoluble inflator, and a centrifugally operable fluid discharging means connected with the interior of said inflator; a shaft to which one of the aforesaid is connected, and means frictionally connecting the other of the aforesaid with said shaft.

13. In a clutch, a shaft, actuating means comprising an inflator fixed to said shaft, and a centrifugally operable fluid discharging mechanism arranged to discharge to the interior of said inflator; said mechanism loosely mounted on said shaft.

JAMES T. DICKSON.